United States Patent
Corcoran

(10) Patent No.: US 10,451,899 B2
(45) Date of Patent: Oct. 22, 2019

(54) TEMPLE COVER FOR EYE GLASSES

(71) Applicant: Daniel Corcoran, Traverse City, MI (US)

(72) Inventor: Daniel Corcoran, Traverse City, MI (US)

(*) Notice: Subject to any disclaimer, the term of this patent is extended or adjusted under 35 U.S.C. 154(b) by 0 days.

(21) Appl. No.: 16/274,604

(22) Filed: Feb. 13, 2019

(65) Prior Publication Data

US 2019/0179171 A1   Jun. 13, 2019

Related U.S. Application Data

(62) Division of application No. 15/409,898, filed on Jan. 19, 2017.

(51) Int. Cl.
*G02C 11/02* (2006.01)
*G02C 5/02* (2006.01)
*G02C 5/14* (2006.01)

(52) U.S. Cl.
CPC ............ *G02C 11/02* (2013.01); *G02C 5/02* (2013.01); *G02C 5/14* (2013.01); *G02C 2200/08* (2013.01)

(58) Field of Classification Search
CPC .......... G02C 11/02; G02C 5/02; G02C 5/146; G02C 2200/08
USPC ............................................................ 351/52
See application file for complete search history.

(56) References Cited

U.S. PATENT DOCUMENTS 3,084,595 A * 4/1963 Watts .................. G02C 5/00
351/111

* cited by examiner

*Primary Examiner* — Wen Huang

(57) ABSTRACT

A temple cover for eye glasses. The removable front cover has a first end component and a second end component. Each of the end components are an integral part of the removable front cover. Together with each temple cover they form an eye glass cover.

7 Claims, 5 Drawing Sheets

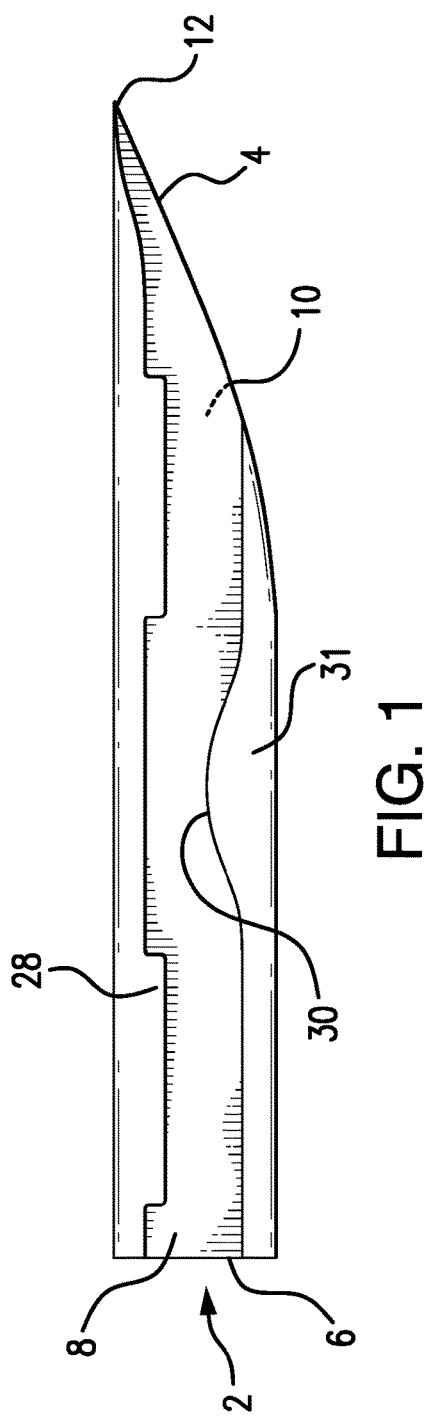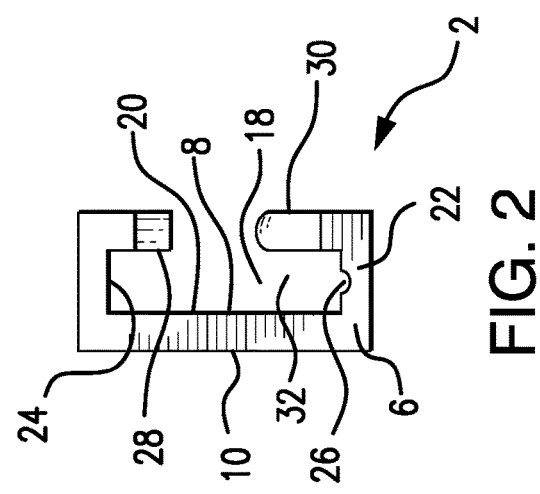

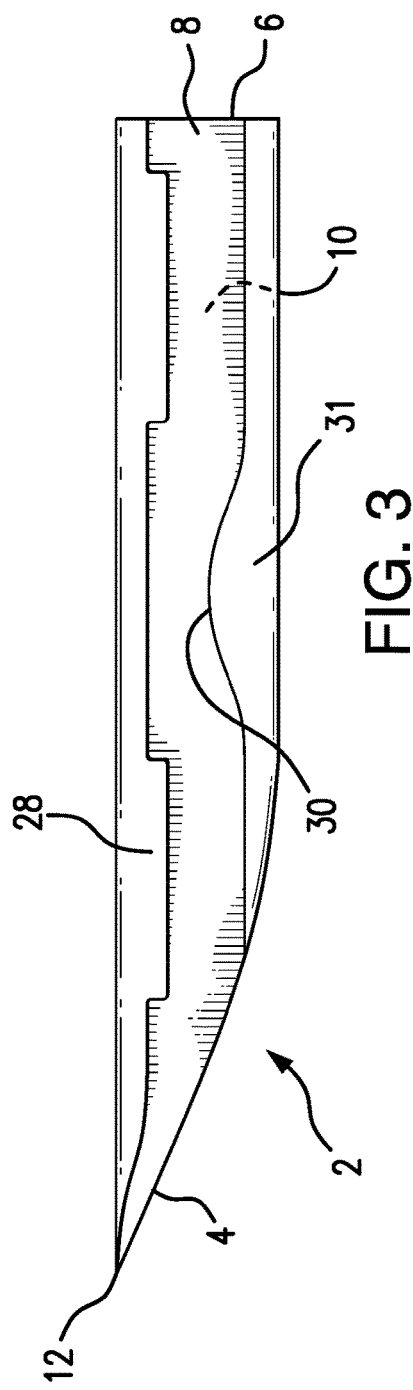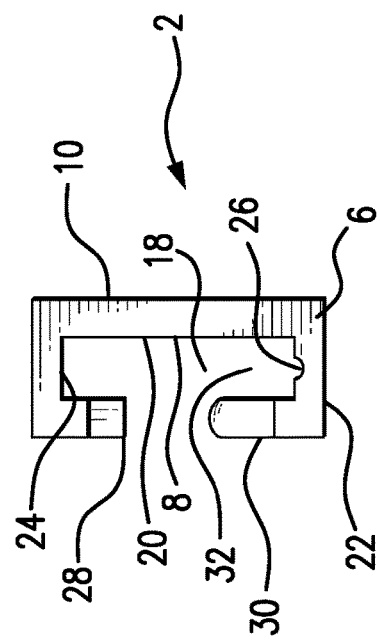

TEMPLE COVER FOR EYE GLASSES

This application is a divisional application from application U.S. Ser. No. 15/409,898, filed Jan. 19, 2017, now pending, from which priority is claimed.

BACKGROUND OF THE INVENTION

The ability to change certain components of eyeglasses is not new to the art. However, the ability to change the frame face and the side bows in the manner disclosed in this application is new.

U.S. Pat. No. 8,651,659 entitled, "Bar For Spectacles and Spectacles Comprising This Bar", issued to Bertelli on Feb. 18, 2014, teaches a bar for spectacles which comprises an elongated member having a rear end suitable for being arranged on the ear of a user and a front end suitable for being connected to the front portion of the spectacles, wherein the front end of the elongated member is extended by one or more additional members by means of at least one longitudinal pin which is inserted in a longitudinal hole made in the front end of the elongated member and in the additional members. The invention also relates to spectacles comprising said bar.

That invention is limited by the ability to change only small portions of the side bar or bow. The present invention teaches a device that completely changes the entire side bar or bow and the entire eye glass holder. Bertelli also teaches a different method of attachment.

U.S. Pat. No. 8,622,540 entitled, "Personalized Display Frames", issued to Burnstein on Jan. 7, 2014, teaches glass frame members which can be individualized and/or accessorized per user's moods or desires, or per display indicia displayed in the frames or new temples of different shapes or colors. Decorative or personalized pin members can be positioned in openings in the display frames or temple members. Mating connecting members can be used to selectively disconnect and change the temple members relative to the frame member.

That invention is limited, in that, it only teaches changing shapes and colors by changing individual pins that change the appearance by shape and color. The present invention teaches an ability to change the entire shape or color of the entire face of the frame and/or bow. The entire segment is changed, not just a limited portion.

U.S. Pat. No. 8,608,309 entitled, "Eyeglass System", issued to Schnoll on Dec. 1, 2013 teaches an eyeglass system having interchangeable components. The eyeglass system includes right and left temples that are connected to the front frame via a decorative pin. The pin is easily removed to allow one to replace the temples with those having another style, or use the temples with another frame, a front cover can also be connected to the frame via the pin to further change the style or design of the eyeglass.

The Schnoll invention is also limited. The Schnoll invention requires several bow or "temples" and "front covers" this is costly to have several different temples and front covers as the front covers contain separate lenses. The present invention allows the modification of the same pair of eyeglasses with separate components, only changing the exterior of the existing frame members.

U.S. Pat. No. 8,545,011 entitled, "Eyeglass With Interchangeable Ornamentation", issued to Chow on Oct. 1, 2013 teaches an eyeglass component mounting system that comprises an eyeglass and decorative component that can be removably attached to the eyeglass, such as onto the ear stem of the eyeglass. For example, the ear stem can comprise a retention zone whereat the decorative component can be secured. In some embodiments, the retention zone comprises a recess and a magnetic retention element that can magnetically attract and secure the component in an engaged position after being fitted into the recess. The engagement or attraction between the retention zone of the ear stem and the decorative component can be maximized when the decorative component is in the engaged position in order to prevent accident or unintentional dislodgement of the decorative component.

The Chow patent is limited in the same manner as Bertelli. That is the removable portion is small and does not change the entire "ear stem" just a small portion. The present invention teaches removable frame face and/or bow.

U.S. Pat. No. 8,201,938 entitled, "Eyeglasses With Slot for Detachable Accessories", issued to Rhee on Jun. 19, 2012 teaches an eyeglass frame that includes a frame front comprising end pieces and temples coupled to the end pieces. At least one temple defines a slot for receiving a decorative or functional accessory. The accessory has a hook and loop fastener that is inserted into the slot to removably attach the accessory to the temple.

This prior art patent is limited, in that, it only deals with a small portion of the eyeglass as in the Bertelli and Chow patents. It also is limited in the fact that it teaches a hook and loop attachment means where the present invention uses a channel and raised retainer to lock the bow cover into place.

THE INVENTION

The present invention is a temple cover for eyeglasses. The temple cover comprises a unitary structure that has a first end and a second end. It also has an inside surface and an outside surface. The first end can be feathered such that there is no line of demarcation between the temple cover and a temple component of eyeglasses when the temple cover is mounted on the temple component. The second end is configured to adjoin a removable front cover for eyeglass frame. The inside surface has a channel located therein. This channel has a back wall, a bottom, and a top, wherein the top of the channel is a groove capable of receiving a top edge of the temple component. There is a raised portion near a center of the bottom with an open space between the raised portion and the back wall of the channel.

There is also a removable front cover for eyeglass frames. The removable front cover comprises a center portion. The center portion comprises a solid bridge between two eyeglass frames. The center portion has a top, a bottom, and a back wall. The top and the bottom each have a channel therein for receiving a solid bridge component of eyeglasses.

The removable front cover has a first end component and a second end component. Each of the end components are an integral part of the removable front cover.

The end component is configured to receive an end of a temple component of eyeglasses. The center portion has mounted thereto the eyeglass frames. The eyeglass frames each have a top portion and a bottom portion that are joined to form each of the frames. The bottom portion, on an outer edge, contains a raised portion to facilitate anchoring the removable front cover to a pair of eyeglasses.

The components are also a kit. The kit comprises a removable front cover and a pair of temple covers. The kit is manufactured from plastic. The kit can also be manufactured from metal.

In another embodiment, the temple cover for eyeglasses comprises a unitary structure that has a first end and a second end, an inside surface and an outside surface. The first end is feathered such that there is no line of demarcation between the temple cover and a temple component of eyeglasses when the temple cover is mounted on the temple component. The second end is configured to adjoin a removable front cover for eyeglass frames. The inside surface has a channel located therein. The channel has a back wall, a bottom, and a top, where the top of the channel is a groove capable of receiving a top edge of the temple component.

There are at least two raised portions located along the bottom front edge with an open space between the raised portions and the back wall of the channel. This embodiment includes a temple cover wherein, in addition, there is a shallow groove located in the bottom to receive a bottom edge of the temple component of the eyeglasses.

BRIEF DESCRIPTION OF THE DRAWINGS

FIG. 1 shows the first temple cover inside surface.
FIG. 2 shows the first temple cover from the second end.
FIG. 3 shows the second temple cover inside surface.
FIG. 4 shows the second temple cover from the second end.

DETAILED DESCRIPTION OF THE DRAWINGS

Figure 5:
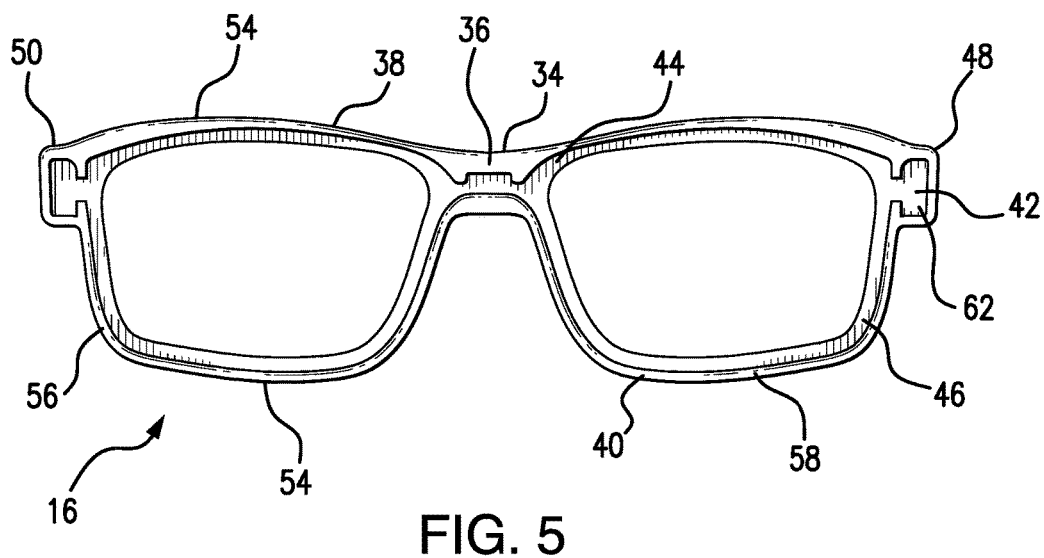
FIG. 5 shows the removable front cover from the inside.

FIG. 1 shows the first temple cover 2 inside surface 8. The temple cover 2 has a first end 4 and a second end 6. The temple cover 2 has an outside surface 10 and the first end 4 is feathered 12. The first end 4 feathering is designed to camouflage the first end with the bow 14 (shown in FIG. 8). Also visible is the top edge 28 and raised portion near 30 near the center 31. The first end 4 is feathered such that there is no line of demarcation between the temple cover 2 and a temple component or bow 14 of eyeglasses when the temple cover 2 is mounted on the temple component 14.

FIG. 2 shows the first temple cover 2 from the second end 6. Also visible is the inside surface 8 and the outside surface 10. The back wall 20, the bottom 22 and the top 24 form the channel 18. In the bottom 22 is a groove 26. Also visible is the top edge 28 and raised portion near 30 near the center 31. There is an open space 32 that is formed between the back wall 20 and the raised portion 30 near the center 31.

FIG. 3 shows the second temple cover 2 inside surface 8. The temple cover 2 has a first end 4 and a second end 6. The temple cover 2 has an outside surface 10 and the first end 4 is feathered 12. The first end 4 feathering is designed to camouflage the first end with the bow 14. Also shown is the top edge 28 and raised portion near 30 near the center 31.

FIG. 4 shows the second temple cover 2 from the second end 6. Also shown is the inside surface 8 and the outside surface 10. The back wall 20, the bottom 22 and the top 24 form the channel 18. In the bottom 22 is a groove 26. Also visible is the top edge 28 and raised portion near 30 near the center 31. There is an open space 32 that is formed between the back wall 20 and the raised portion 30 near the center 31.

FIG. 5 shows the removable front cover 16 from the inside 62. The removable front cover 16 has a center portion 34 that has a solid bridge 36. The removable front cover 16 has a top 38, a bottom 40 and a back wall 42. The top 38 has a channel 44. The bottom 40 also has a channel 46. The removable front cover 16 has a first end 48 and a second end 50. The removable front cover 16 has a top portion 54 and a bottom portion 56. Also shown is a raised portion 58.

Figure 6:
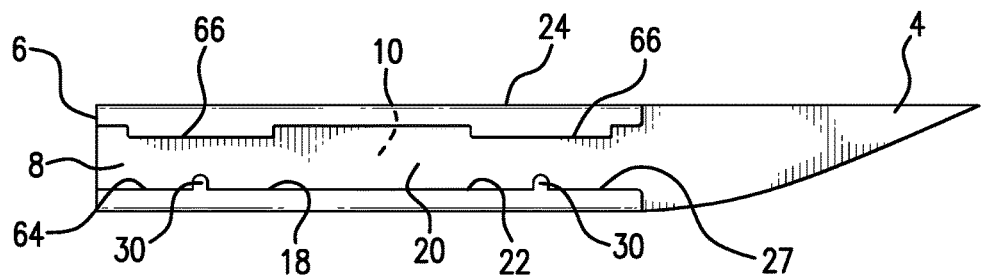
FIG. 6 shows the second embodiment of the temple cover.

FIG. 6 shows the second embodiment of the temple cover 2. The temple cover 2 comprises a unitary structure that has a first end 4 and a second end 6. There is also an inside surface 8 and an outside surface 10. The first end 4 is feathered such that there is no line of demarcation between the temple cover 2 and a temple component or bow 14 of eyeglasses when the temple cover 2 is mounted on the temple component 14. The second end 6 configured to adjoin a removable front cover 16 for eyeglass frames. Here, the inside surface 8 has a channel 18 located therein, this channel 18 has a back wall 20, a bottom 22, and a top 24. The top 24 of the channel 18 is capable of receiving a top edge 28 (shown in FIG. 8) of the temple component 14. On this top edge 28 is at least two raised portions 66 located along the bottom 22 front edge 64 with an open space between the raised portions 66 and the back wall 20 of the channel 18.

There is a groove 26 located in the bottom 22 to receive a bottom 22 front edge 64 (shown in FIG. 8) of the temple component 2 of the eyeglasses. On this bottom 22 front edge 64 is at least two raised portions 68 located along the bottom 22 front edge 64 with an open space between the raised portions 66 and the back wall 20 of the channel 18.

This embodiment includes, in addition, a groove 26 located in the bottom 22 to receive a bottom 22 front edge 64 of the temple component 14 of the eyeglasses.

Figure 7:
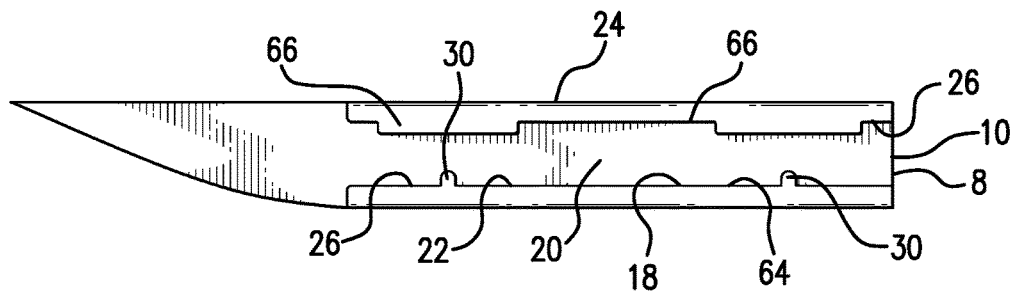
FIG. 7 shows the second embodiment of the temple cover.

FIG. 7 shows the second embodiment of the temple cover 2. The temple cover 2 comprises a unitary structure that has a first end 4 and a second end 6. There is also an inside surface 8 and an outside surface 10. The first end 4 is feathered such that there is no line of demarcation between the temple cover 2 and a temple component or bow 14 of eyeglasses when the temple cover 2 is mounted on the temple component 14. The second end 6 configured to adjoin a removable front cover 16 for eyeglass frames. Here, the inside surface 8 has a channel 18 located therein, this channel 18 has a back wall 20, a bottom 22, and a top 24. The top 24 of the channel 18 is capable of receiving a top edge 28 (shown in FIG. 8) of the temple component 14. On this top edge 28 is at least two raised portions 66 located along the bottom 22 front edge 64 with an open space between the raised portions 66 and the back wall 20 of the channel 18.

There is a groove 26 located in the bottom 22 to receive a bottom 22 front edge 64 (shown in FIG. 8) of the temple component 2 of the eyeglasses. On this bottom 22 front edge 64 is at least two raised portions 68 located along the bottom 22 front edge 64 with an open space between the raised portions 66 and the back wall 20 of the channel 18.

This embodiment includes, in addition, a groove 26 located in the bottom 22 to receive a bottom 22 front edge 64 of the temple component 14 of the eyeglasses.

Figure 8:
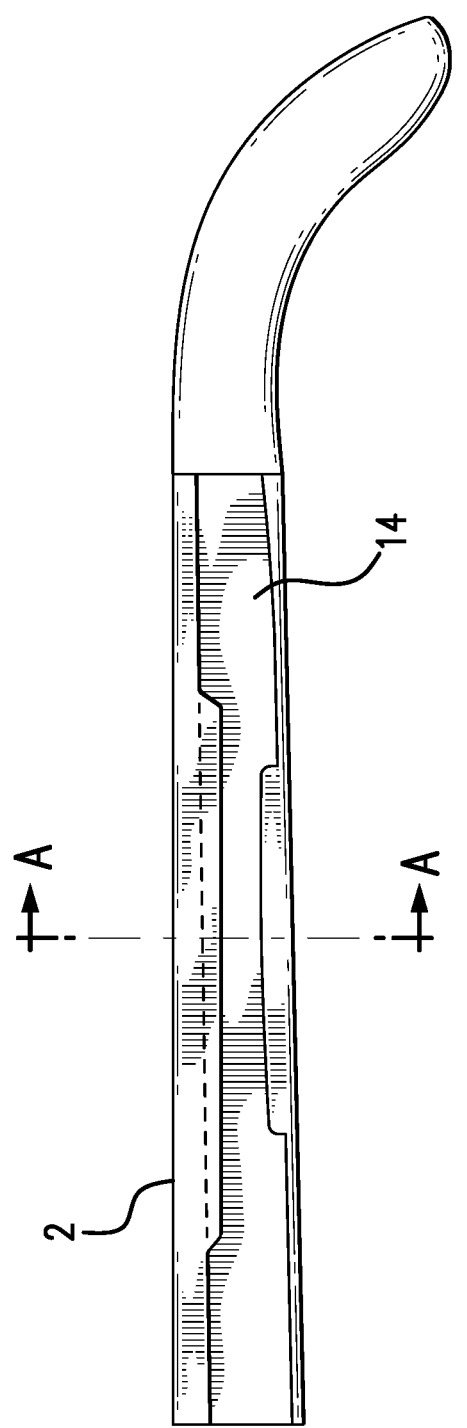
FIG. 8 shows the first temple cover with line A-A.
Figure 9:
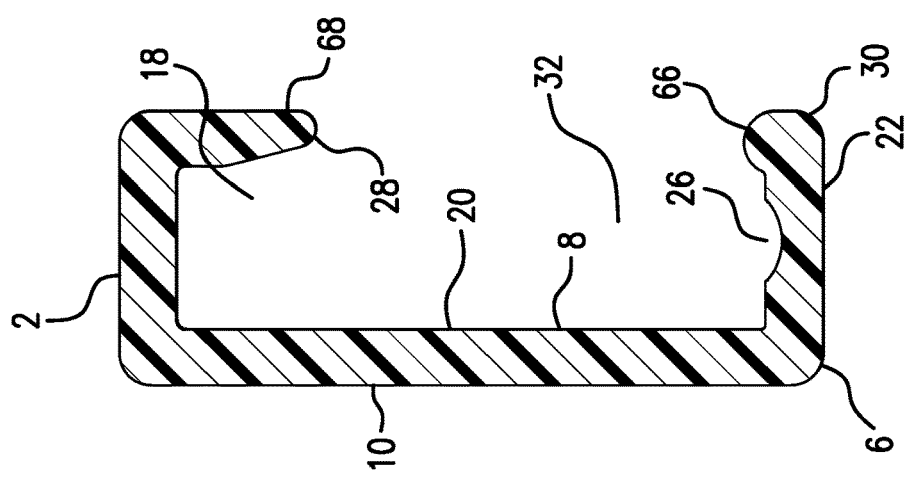
FIG. 9 shows the second embodiment of the temple cover along line A-A.

FIG. 8 shows the first temple cover 2 mounted on bow 14.
FIG. 9 shows the second embodiment of the temple cover 2 along line A-A. Here temple cover 2 is seen from the second end 6. Also visible is the inside surface 8 and the outside surface 10. The back wall 20, the bottom 22 and the top 24 form the channel 18. In the bottom 22 is a groove 26. Also visible is the top edge 28 and raised portion near 30 near the center 31. There is an open space 32 that is formed between the back wall 20 and the raised portion 30 near the center 31.

Figure 10:
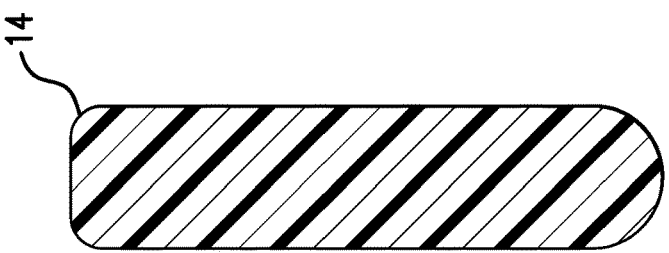
FIG. 10 shows eye glass bow along line A-A.

FIG. 10 shows eye glass bow 14 along line A-A.

Figure 11:
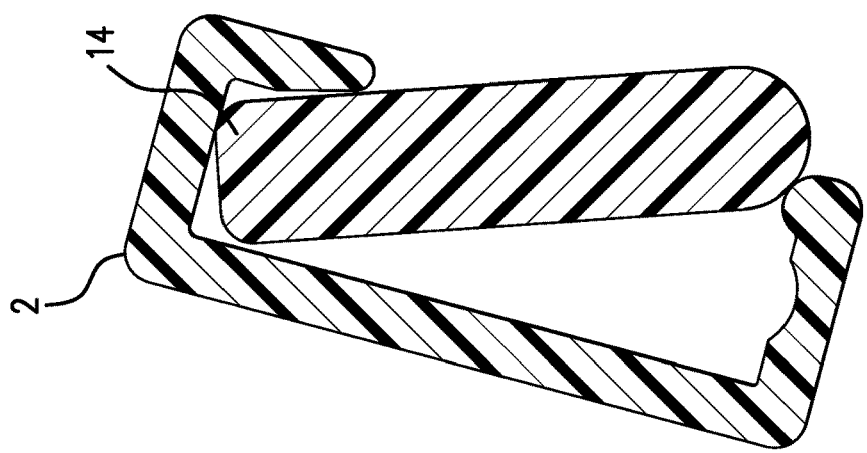
FIG. 11 shows the second embodiment of the temple cover with the eye glass bow being inserted into the along line A-A into the temple cover.

FIG. 11 shows the second embodiment of the temple cover 2 with the eye glass bow 14 being inserted into the temple cover 2 along line A-A.

Figure 12:
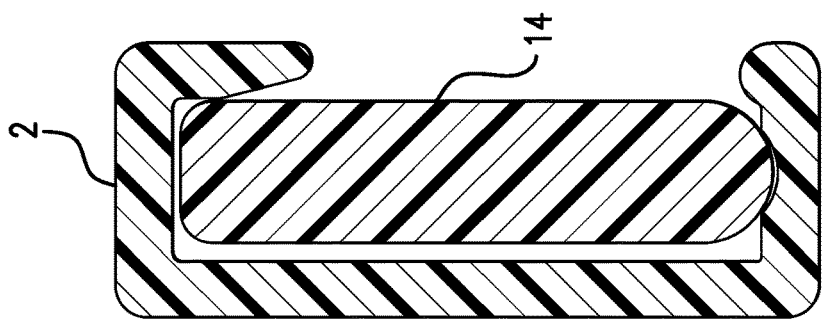
FIG. 12 shows the eye glass bow inserted into the second embodiment of the temple cover along line A-A.

FIG. 12 shows the eye glass bow 14 inserted into the second embodiment of the temple cover 2 along line A-A.

What is claimed is:

1. A removable front cover for eyeglass frames, said removable front cover comprising:
    a. a center portion, said center portion comprising a solid bridge between two eyeglass frames, said center portion having a top, a bottom, and a back wall, said top and said bottom each having a channel therein for receiving a solid bridge component of eyeglasses;
    b. said removable front cover having a first end component and a second end component, each said end component being an integral part of said removable front cover;
    c. each said end component being configured to receive an end of a temple component of eyeglasses;
    d. said center portion having mounted thereto said eyeglass frames, said eyeglass frames each having a top portion and a bottom portion that are joined to form each of the said frames, said bottom portion, on an outer edge, containing a raised portion to facilitate anchoring said removable front cover to a pair of eyeglasses.

2. In combination, the removable front cover of claim 1 when mounted on a set of eyeglasses.

3. A kit, said kit comprising a pair of temple covers and the removable front cover as claimed in claim 1.

4. The kit as claimed in claim 3 wherein each of the components are manufactured from plastic.

5. The kit as claimed in claim 3 wherein each of the components are manufactured from metal.

6. A temple cover for eyeglasses, said temple cover comprising:
    i. a unitary structure having a first end and a second end, an inside surface and an outside surface;
    ii. said first end being feathered such that there is no line of demarcation between said temple cover and a temple component of eyeglasses when said temple cover is mounted on said temple component;
    iii. said second end configured to adjoin a removable front cover for eyeglass frames;
    iv. said inside surface having a channel located therein, said channel having a back wall, a bottom, and a top, wherein said top of said channel is a groove capable of receiving a top edge of said temple component;
    v. there being at least two raised portions located along said bottom front edge with an open space between said raised portions and said back wall of said channel.

7. A temple cover as claimed in claim 6 wherein, in addition, there is a groove located in said bottom to receive a bottom edge of said temple component of said eyeglasses.

* * * * *